June 28, 1927.
N. A. CHRISTENSEN
1,633,770
AUTOMOTIVE ENGINE COMPRESSOR
Filed May 10, 1926
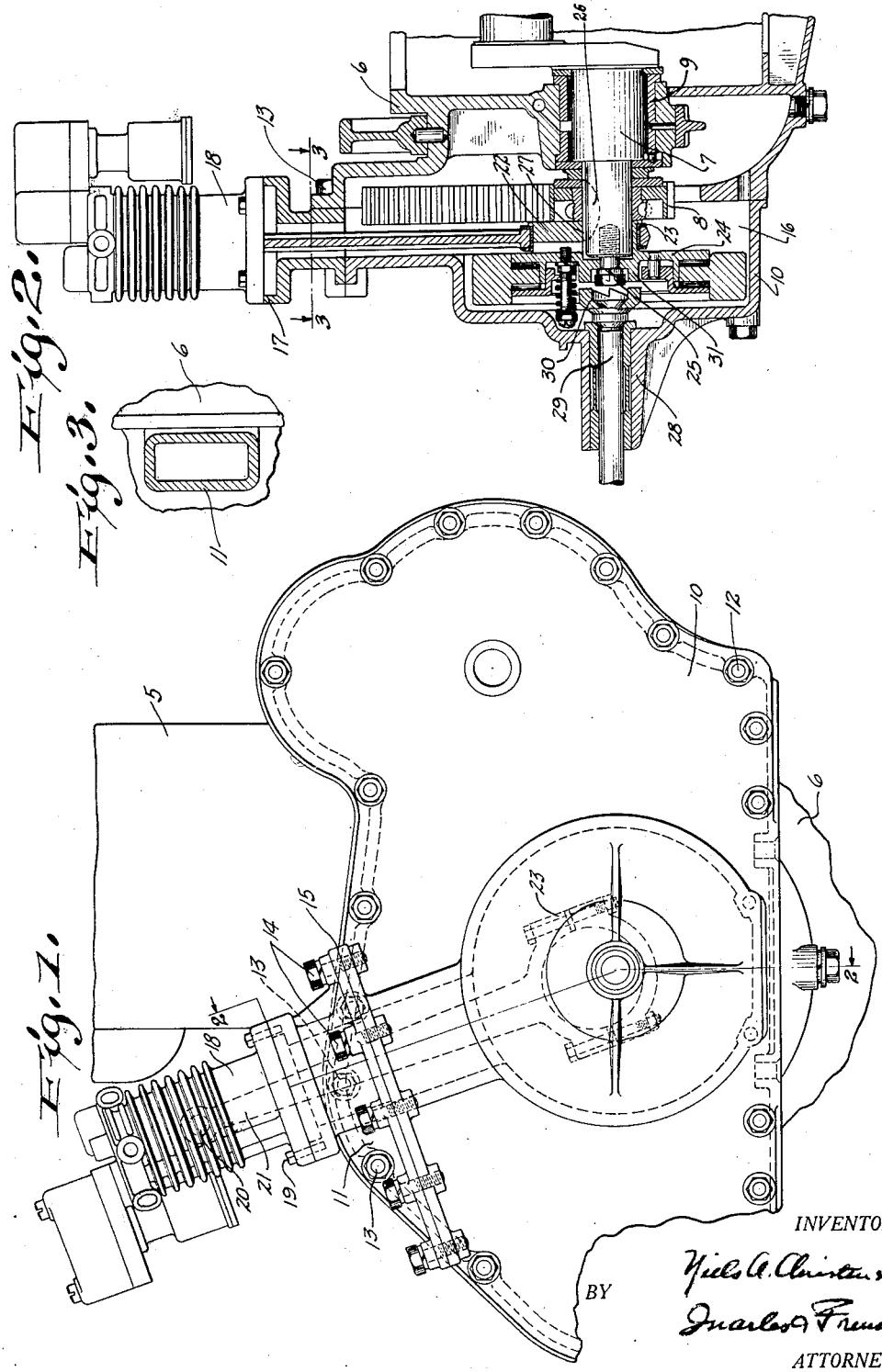
INVENTOR.
Niels A. Christensen
Charles French
BY
ATTORNEYS Patented June 28, 1927.

1,633,770

UNITED STATES PATENT OFFICE.

NIELS A. CHRISTENSEN, OF CLEVELAND, OHIO.

AUTOMOTIVE ENGINE COMPRESSOR.

Application filed May 10, 1926. Serial No. 108,056.

The invention relates to compressors, and more particularly to compressors for compressed air equipment of automotive vehicles.

One of the objects of the invention is to provide an improved construction over that shown in my copending application, Serial No. 47,933, filed August 3, 1925, by making the end plate of a plurality of sections, which provides for an end plate of relatively small increase in depth over end plates for engines not equipped with compressors, and further permits ready adjustment of the big end bearing of the compressor drive upon the removal of one of the sections.

A further object of the invention is to provide a novel and compact form of drive connection for the compressor by forming its drive eccentric integral with one of the parts of the crank shaft balancer which is secured to the extended end of the crank shaft.

The invention further consists in the several features hereinafter set forth and more particularly defined by claims at the conclusion hereof.

In the drawings Fig. 1 is a front elevation view of an automotive engine equipped with the apparatus embodying the invention;

Fig. 2 is a vertical sectional view taken on the line 2—2 of Fig. 1;

Fig. 3 is a detail sectional view taken on the line 3—3 of Fig. 2.

In the drawings the numeral 5 designates an internal combustion engine of the automotive type having a crank case 6, a crank shaft 7 journalled therein, and 8 one of the timing gears mounted on said shaft beyond the main bearing 9 for the front end of the crank shaft.

The numerals 10 and 11 designate parts of the removable cover plate enclosing the timing gears and other gears usually mounted at the front of the engine. The section 10 of the front cover plate is connected to the crank case 6 of the engine by bolts 12, and the section 11 is connected to the crank case of the engine by a bolt 13. The sections 10 and 11 are joined together by bolts 14 along a plane 15 which is at an angle, preferably a right angle, to the plane that these sections make with the crank case. The section 10 forms a crank case portion 16 for the compressor and the section 11 has a cylinder mounting pad portion 17 upon which the cylinder 18 of the compressor is mounted, and to which it is detachably secured by bolts 19.

A piston of usual construction works in the bore of the compressor cylinder 18 and has its wrist-pin operatively connected by connecting-rod 21 with an eccentric 22. The big end bearing 23 of the connecting rod is adjustably mounted on the eccentric 22.

The eccentric 22 is shown in Fig. 2 as formed integral with a member 24 forming a part of a crank shaft balancer of the Lanchester type, said member being secured to the front end of the crank shaft by a bolt 25 and being keyed thereto by a key 26 which engages is a keyway 27 in the eccentric 22.

The crank case section 10 of the end plate has a trunnion bearing portion 28 in which the end starter shaft 29 is mounted for rotation and endwise movement, said shaft carrying a starter claw or clutch member 30 adapted to be engaged with a cooperative clutch member 31 formed as a part of the member 24.

The parts of the balancer other than the part 24 have not been specifically described, as they are of known construction, and as the invention herein does not reside in the specific construction of the balancer or its mode of operation though the association of the drive eccentric for the compressor with one of the parts of the balancer is deemed to be patentably novel and of advantage in providing for a very compact arrangement of compressor drive.

With the above construction, the rotation of the crank shaft 7 of the engine turns the member 24 and with it the eccentric 22, and thus, through the connecting-rod 21, reciprocates the piston, not shown, in the compressor cylinder 18, the inlet and exhaust valves of the compressor not being shown but operating in the usual manner to respectively admit air into the compressor cylinder and expel it therefrom to the reservoir.

Removal of the cylinder 18, upon removal of the bolts 19, permits inspection of the piston rings and wrist-pin bearings. Removal of the bolts 14 and the bolts 12, with the loosening of the bolt 13, if necessary, permits the removal of the section 10 of the end plate so as to provide access to the big end bearing 23 of the connecting-rod, for the purpose of replacement or repair, and thus this big end bearing may be adjusted and inspected without disconnecting the cylinder 18 from the section 11 of the end plate.

I desire it to be understood that this invention is not to be limited to any specific form or arrangement of parts except in so far as such limitations are specified in the claims or necessitated by the prior art.

What I claim as my invention is:

1. In an automotive engine, the combination with the drive connection of the compressor of a detachable front cover plate comprising a plurality of sections detachably secured to the crank case of the engine and detachably secured together at an angle to the plane of their connection with the crank case of the engine whereby removal of one of said sections permits ready inspection of the drive connection for the compressor.

2. In an automotive engine, a detachable front cover plate comprising a plurality of sections detachably secured to the crank case of the engine and to each other, one of said sections having a compressor crank case portion and the other of said sections having a compressor cylinder mounting portion.

3. In an automotive engine, the combination with the crank case of the engine and the crank shaft, of a detachable front cover plate secured to said crank case, a compressor cylinder mounted on said cover plate, a piston working in said cylinder, a crank shaft balancer connected to said crank shaft and having an eccentric formed integral with one of its parts, and means including a connecting-rod operatively connecting said eccentric with the piston of the compressor.

4. In an automotive engine, the combination with the driving connection of the compressor of a detachable front cover plate comprising a plurality of sections, each of said sections being independently detachably secured to the crank case of the engine and detachably secured together at a point at right angles to their plane of connection with the crank case, one of said sections having a compressor crank case portion, said last-named section being removable independently of the other section for permitting ready inspection of the driving connection for the compressor.

In testimony whereof, I affix my signature.

NIELS A. CHRISTENSEN.